United States Patent [19]
Arnold et al.

[11] Patent Number: 5,651,243
[45] Date of Patent: Jul. 29, 1997

[54] CUTTING AND TRANSPORTING MECHANISM FOR STALK AGRICULTURAL PRODUCTS

[75] Inventors: Rudolf Arnold, Saulgau; Anton Wicker, Saulgau-Bogenweiler; Hans Rauch, Saulgau-Kleintissen; Josef Gebele, Hosskirch-Huettenreute, all of Germany

[73] Assignee: Claas Saulgau GmbH, Saulgau, Germany

[21] Appl. No.: 561,079

[22] Filed: Nov. 20, 1995

[30] Foreign Application Priority Data

| Nov. 18, 1994 | [DE] | Germany | 44 41 074.3 |
| Nov. 18, 1994 | [DE] | Germany | 44 41 078.6 |
| Sep. 23, 1995 | [DE] | Germany | 195 35 453.2 |
| Sep. 23, 1995 | [DE] | Germany | 195 35 454.0 |

[51] Int. Cl.⁶ .................................................. A01D 45/02
[52] U.S. Cl. .......................... 56/94; 56/102; 56/119; 56/255; 56/295
[58] Field of Search .......................... 56/94, 102, 119, 56/255, 295, 100, 101, 121.4, 291, 244

[56] References Cited

U.S. PATENT DOCUMENTS

| 3,930,354 | 1/1976 | Borderie ................................. 56/94 |
| 4,272,947 | 6/1981 | Mizzi .............................. 56/121.4 X |
| 4,594,842 | 6/1986 | Wolters et al. ........................... 56/94 |
| 4,926,623 | 5/1990 | Fiener ................................... 56/94 X |
| 5,040,362 | 8/1991 | Morgan et al. ...................... 56/94 X |
| 5,150,565 | 9/1992 | Bich ........................................ 56/102 |
| 5,546,737 | 8/1996 | Moosbrucker ........................... 56/94 |

FOREIGN PATENT DOCUMENTS

| 0286882 | 3/1988 | European Pat. Off. . |
| 0099527 | 8/1988 | European Pat. Off. . |

Primary Examiner—Terry Lee Melius
Assistant Examiner—Victor Batson
Attorney, Agent, or Firm—Michael J. Striker

[57] ABSTRACT

A cutting and transporting mechanism for stalk harvesting products comprises at least one cutting disc, at least transporting disc arranged coaxially relative to the cutting disc and provided with a plurality of transporting prongs arranged on a circumference of the transporting disc, a rotatable reamer associated with the transporting prongs at a discharge location. The rotating reamer has a rotary axis located inside a circumference of the transporting disc and is driven in a direction corresponding to a direction of rotation of the transporting disc. The cutting discs carry on their outer sides catching strips extending at a flat angle β to the tangent. They transport the cut product stalks radially inwardly and are inserted in depressions of the transporting discs.

19 Claims, 2 Drawing Sheets

CUTTING AND TRANSPORTING MECHANISM FOR STALK AGRICULTURAL PRODUCTS

BACKGROUND OF THE INVENTION

The present invention relates to a cutting and transporting mechanism for stalk agricultural products, in particular corn.

Cutting and transporting mechanisms of this general type are known in the art. One of such cutting and transporting mechanisms is disclosed in the European patent application 0 286 882. Here the mechanism has cutting and transporting drums provided in a lower part with a cutting disc having a plurality of cutters, and over it transporting prongs which coaxially rotate in several plans. For preventing losing of the cut corn stalk with the transporting prongs during rotation, the tips of the transporting prongs are inclined relative to the radial in the circumferential direction, and therefore must be cleaned at the discharge point by oppositely rotating tools provided with fingers. The fingers have, in the direction cooperating with the transporting prongs, a speed component oriented toward the transporting prongs. It acts so as to press the corn stalk against the transporting surface of the transporting prongs. As a result, the corn stalks are cleaned only forcedly from the transporting prongs, and with the shaping of the transporting prongs a reliable transportation of the corn stalk during the rotation is very limited.

Another cutting and transporting device is disclosed in the European patent application 0 099 527. In this application the rotatable cutting discs and coaxial transporting discs are provided. They rotate in the same direction but with substantially different circumferential speeds. The cut blade stalks are taken into the depressions between neighboring transporting prongs and transported to a discharge location. For rotating the blades during transportation in the depressions, stationary distributing tips which overlap the guiding locations are provided. They transfer the harvested product from further spaced cutting locations. This type of distribution of the cutting width into several working regions with wide distributors and hook-shaped guiding points has several disadvantages. Stalk which run in the cutting gap not straight are pressed from the distributor tips and cut inclinedly. Also, the hook-shaped guiding points hinder the cutting process, especially or fine-blade harvested products.

SUMMARY OF THE INVENTION

Accordingly, it is an object of the present invention when compared to the solution proposed in the European patent application 0 286 882 to provide a cutting and transporting mechanism which eliminates the difficulties during reaming of the transporting prongs, and moreover opens further design possibilities for shaping of the transporting prongs.

In keeping with these objects and with others which will become apparent hereinafter, one feature of the present invention resides, briefly stated, in a cutting and transporting mechanism in which the rotary axis of the rotating reamer is located inside the rotary circle of the associated transporting disc, and it is driven in the same direction as the transporting disc.

When the cutting and transporting mechanism is designed in accordance with the present invention, it eliminates the disadvantages of the prior art and provides for the above mentioned highly advantageous results.

In accordance with a further feature of the present invention, it is advantageous when the reamer is formed as a disc provided with a plurality of teeth and arranged under or over the associated transporting disc.

It is further advantageous, in accordance with another feature of the present invention, when one reamer is associated with each of the transporting discs.

In accordance with an especially advantageous feature of the invention, two substantially identically formed transporting discs are provided, and their associated reamers are arranged between both transporting discs. The lower disc takes over then the transportation of the stalk foot parts, while the upper transporting disc transports the main part of the stalk mass, and the stalks can be supported on the upper surface of the transporting disc.

The arrangement of the transporting discs and the reaming in accordance with the present invention provides an efficient reaming of the transporting discs such that the transporting prongs can be designed so that two neighboring transporting prongs form an outwardly open pocket and the stalks are transported in an especially reliable manner. The design of the transporting discs and the reamers allows to form with a simple vertical wall a transporting passage in which the stalk flow can be positively transported.

It is also an object of the present invention when compared to the solution proposed in the European patent application 0 099 527 to provide a cutting and transporting mechanism which eliminates the disadvantages of the solution disclosed in this reference, and in addition to a shaping for the transporting prongs open a further design possibility for the cutting device.

In accordance with the present invention this object is achieved in that no stationary guiding points are provided, but instead on the circumference of the cutting disc on the upper side where the coextending catching strips are mounted at distances from one another, and the catching strips extend at a flat angle to tangents, while the outwardly running leading starting point of the catching strips is located radially outwardly further than the trailing end. The cut stalks are therefore supplied into the depressions between the transporting prongs and held by the trailing catching strips in them.

In accordance with a new feature of the present invention, the catching strips in their leading starting portion extend to the region of the cutter and in their trailing end extend to the region of the depressions in the transporting disc.

It is also a further feature of the present invention that the depressions of the transporting discs are curved so that stalks moving on them can slide easily from the catching strips into the depressions, and with further rotating transporting discs have the tendency to be retained in them there since the curvature of the depressions extends to the tips of the transporting prongs and partially surround the stalks.

In accordance with further features of the present invention, the transporting prongs form with their outwardly directed end side a running-in surface for the stalk product, the trailing edge of which is located radially further inwardly than the leading tip of the neighboring subsequent transporting prong. In the coaxially arranged transporting discs, the corresponding transporting tongues are offset relative to one another in a rotary direction by a small distance. Also, the offset is such that the upper transporting prongs lead the lower transporting prongs by a small distance.

When the cutting and transporting mechanism is designed in accordance with the present invention, the harvested stalk products are introduced reliably into the pockets (depressions) of the transporting discs formed between the transporting tongues. It is guaranteed that with the transporting discs arranged over one another each plant is transported only into pockets of the transporting discs which are located over one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
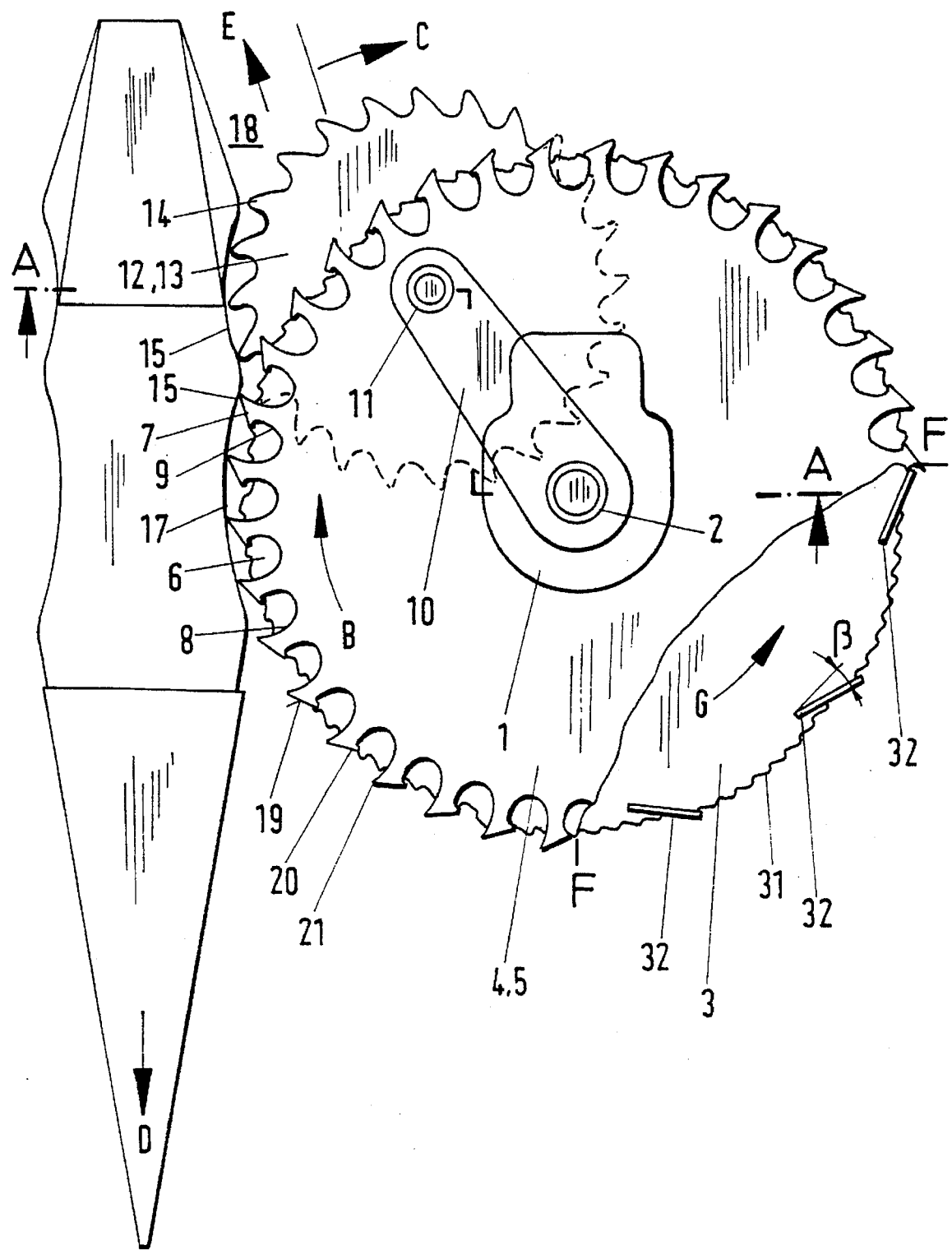
FIG. 1 is a view schematically showing a corn harvesting device of a cutting and transporting mechanism in accordance with the present invention from above.
Figure 2:
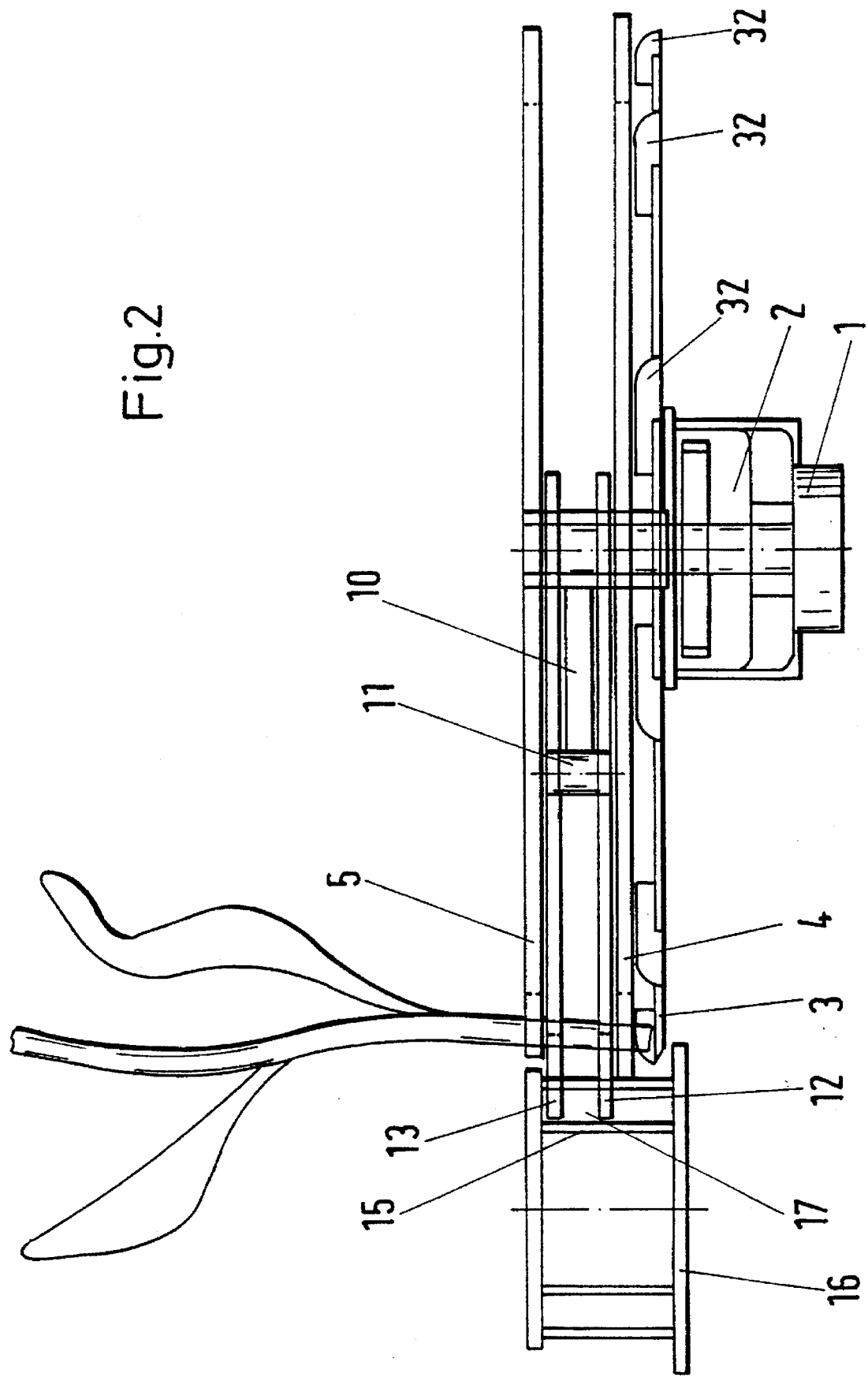
FIG. 2 shows the corn harvesting device in a section taken along the line A—A in FIG. 1.

A cutting and transporting mechanism in accordance with the present invention has a cutting disc 3 supported on a substantially vertically extending shaft 2 on a shoe-shaped part 1 of a machine frame. The cutting disc 3 is driven by a not shown dive. Two transporting discs 4 and 5 are arranged coaxially to the cutting disc 3 and driven in direction of the arrow B. The transporting discs 4 and 5 are provided on their periphery with a plurality of outwardly open depressions 6 formed so that a transporting prong 7 is provided between the depressions. The transporting flank 8 of the transporting prongs is formed so that its outer tip runs forwardly of a radius in a rotary direction. The not transporting flank 9 of the transporting prong 7 acts to support the stalk foot portion so that it is held inside the open depressions 6 of the upper transporting disc 5 and the lower transporting disc 4 so that it cannot completely turn over.

For a reliable introduction of the stalk of the agricultural product into the depressions 6 of the transporting discs 4 and. 5, the transporting prongs 7 are provided on their outwardly directed end side 19 with a running-in surface. The running-in surface is located with its trailing edge 20 radially inwardly farther than the leading tip 21 of the neighboring subsequent transporting prong 7.

During the operation it is desirable to provide a not-tipped introduction of the stalks into the depressions 6 of two or more cooperating transporting discs 4 and 5, which depressions are arranged coaxially over one another. For this purpose, in a position of the attachment in which it is inclined forwardly in a traveling direction, the transporting prongs 7 which are located over one another are offset in the rotary direction so that the upper transporting prongs 7 lead the lower transporting prong 7 by a small distance.

The cutting and transporting mechanism is further provided with a substantially vertical wall 15. The wall 15 is formed so that it corresponds to a circumference of the transporting discs 4 and 5 and therefore forms a transporting passage 17.

Two reamers 12 and 13 are located between the transporting discs 4 and 5. They are supported rotatably and driveably about a substantially vertical axis 11 by a drive housing 10 which are mounted on the machine. The reamers 12 and 13 are disc-shaped. They are provided on their periphery with a plurality of teeth which over a part of their circumference completely overlap the open pockets 6 of the transporting discs 4 and 5. The reamers 12 and 13 are driven in direction of the arrow C so that their circumferential speed is equal to or substantially greater than the circumferential speed of the transporting discs 4 and 5. The substantially vertical wall 15 has a bottom 16 and, as mentioned above, forms the transporting passage 17.

The transporting discs 4 and 5 in the region F—F in FIG. 1 are shown in section, so that the cutting disc 3 can be seen. The cutting disc 3 is provided on its circumference with a plurality of cutters 31. A plurality of catching strips 32 are mounted on the upper side of the cutting disc 3 which for example is driven in direction of the arrow G. The catching strips 32 extend at a flat angle $\beta$ to the tangent.

During the operation the corn harvesting device moves in direction of the arrow D. The corn stalks standing on the field are separated by the cutting disc 3 and engage immediately after it by one of the catching strips 32 and moved radially inwardly so that they are introduced into one of the depressions 6 of the transporting discs 4 and 5 and transported further in direction of the arrow B until they reach the region of the teeth 14 of the reamers 12 and 13. The teeth 14 transport in the circumferential direction the corn stalks from the open pockets 6 and bring them into an open trough 18. From which they are supplied by not shown transporting means in direction of the arrow E to a field chopper.

It will be understood that each of the elements described above, or two or more together, may also find a useful application in other types of constructions differing from the types described above.

While the invention has been illustrated and described as embodied in a cutting and transporting mechanism for stalk agricultural products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A cutting and transporting mechanism for stalk harvesting products, comprising at least one cutting disc; at least one transporting disc arranged coaxially relative to said cutting disc and provided with a plurality of transporting prongs arranged on a circumference of said transporting disc; a rotatable reamer associated with said transporting prongs at a discharge location, said rotating reamer having a rotary axis located inside a circumference of said transporting disc and being driven in a direction corresponding to a direction of rotation of said transporting disc.

2. A cutting and transporting mechanism as defined in claim 1, wherein said reamer is formed as a disc provided with a plurality of teeth.

3. A cutting and transporting mechanism as defined in claim 1; and further comprising a further such transporting disc arranged coaxially with said cutting disc; and a further such reamer, each of said reamers being associated with a respective one of said transporting discs.

4. A cutting and transporting mechanism as defined in claim 1; and further comprising another such transporting disc which is formed as said first mentioned transporting disc, said transporting discs being arranged coaxially with a distance from one another, said reamer being arranged between said transporting discs.

5. A cutting and transporting mechanism as defined in claim 1; and further comprising a wall extending substantially transversely to a plane of said transporting discs and associated with said transporting disc and said reamer at a distance from said transporting disc and said reamer to form a transporting passage.

6. A cutting and transporting mechanism defined in claim 1, wherein said transporting prongs of said transporting disc have transporting flanks and not-transporting flanks, said transporting flanks and said not-transporting flanks of neighboring ones of said transporting prongs form pockets which are open to a circumference of said transporting disc and form depressions, said depressions being curved so that a stalk moving on them is easily supplied by said catching strips into said depression and during further rotation of said transporting discs has a tendency to be retained in said depression, while a curvature of said depression extends to a tip of said transporting prongs to partially surround the stalks.

7. A cutting and transporting mechanism as defined in claim 6, wherein said transporting prongs with said transporting flanks are formed so that their outer tips run forward of radii of said transporting disc in a rotary direction.

8. A cutting and transporting mechanism as defined in claim 6, wherein said transporting prongs with said not transporting flanks are formed so that their outer tips trail relative to radii of said transporting disc in the rotary direction.

9. A cutting and transporting mechanism as defined in claim 1, wherein said transporting prongs have an outwardly directed end side which forms a running-in surface for stalk agricultural products, said running-in surface has a trailing edge as considered in rotary direction which trailing edge is located radially inwardly farther than a leading tip of an adjacent trailing transporting prong.

10. A cutting and transporting mechanism as defined in claim 1; and further comprising another transporting disc which is coaxial to said first mentioned transporting disc, said transporting prongs of said transporting discs being offset in rotary direction relative to one another.

11. A cutting and transporting mechanism as defined in claim 1; and further comprising an additional transporting disc which is arranged coaxially relative to said first mentioned transporting disc, said transporting prongs of said transporting discs being offset relative to one another in rotary direction so that the transporting prongs of an upper one of said transporting discs is offset relative to said transporting prongs of a lower one of said transporting discs.

12. A cutting and transporting device for stalk harvested products, comprising at least one rotatable cutting disc provided with a plurality of cutters on its periphery; at least one transporting disc arranged over said cutting disc and provided on its periphery with a plurality of transporting prongs and transporting pockets, said cutting disc and said transporting disc being rotatable with different peripheral speeds, said cutting disc on its circumference and on its upper side being provided with a plurality of standing catching strips arranged at distance from one another on top of said cutting disc to guide said strips to said transporting pockets, said catching strips extending at a flat angle relative to tangents of a periphery of said cutting disc, said catching strips being arranged so that a leading starting portion of said catching strips is located radially outwardly farther than a trailing end of said catching strips.

13. A cutting and transporting device as defined in claim 12, wherein said catching strips in the region of said leading starting portion extend to a region of said cutting disc, and in the region of said trailing end extend to the region of said depressions of said transporting discs.

14. A cutting and transporting device as defined in claim 12, wherein said transporting prongs of said transporting disc have transporting flanks and not-transporting flanks, said transporting flanks and said not-transporting flanks of neighboring ones of said transporting prongs form pockets which are open to a circumference of said transporting disc and form depressions, said depressions being curved so that a stalk moving on them is easily supplied by said catching strips into said depression and during further rotation of said transporting discs has a tendency to be retained in said depression, while a curvature of said depression extends to a tip of said transporting prongs to partially surround the stalks.

15. A cutting and transporting device as defined in claim 14, wherein said transporting prongs with said transporting flanks are formed so that their outer tips run forward of radii of said transporting disc in a rotary direction.

16. A cutting and transporting device as defined in claim 14, wherein said transporting prongs with said not transporting flanks are formed so that their outer upper tips trail relative to radii of said transporting disc in the rotary direction.

17. A cutting and transporting device as defined in claim 12; and further comprising another transporting disc which is coaxial to said first mentioned transporting disc, said transporting prongs of said transporting discs being offset in rotary direction by a small distance relative to one another.

18. A cutting and transporting device as defined in claim 12; and further comprising an additional transporting disc which is arranged coaxially relative to said first mentioned transporting disc, said transporting prongs of said transporting discs being offset relative to one another in rotary direction so that the transporting prongs of an upper one of said transporting discs is offset relative to said transporting prongs of a lower one of said transporting discs.

19. A cutting and transporting device for stalk harvested products, comprising at least one rotatable cutting disc provided with a plurality of cutters on its periphery; at least one transporting disc arranged over said cutting disc and provided on its periphery with a plurality of transporting prongs and transporting pockets, said cutting disc and said transporting disc being rotatable with different peripheral speeds, said cutting disc on its circumference and on its upper side being provided with a plurality of standing catching strips arranged at distance from one another, said catching strips arranged at distance from one another, said catching strips extending at a flat angle relative to tangents of a periphery of said cutting disc, said catching strips being arranged so that a leading starting portion of said catching strips is located radially outwardly farther than a trailing end of said catching strips, said transporting prongs having an outwardly directed end side which forms a running-in surface for stalk agricultural products, said running-in surface has a trailing edge as considered in rotary direction which trailing edge is located radially inwardly farther than a leading tip of an adjacent trailing transporting prong.

* * * * *